G. F. FISHER & R. B. PRICE.
TIRE BUILDING MACHINE.
APPLICATION FILED JULY 12, 1915.
1,264,170.
Patented Apr. 30, 1918.
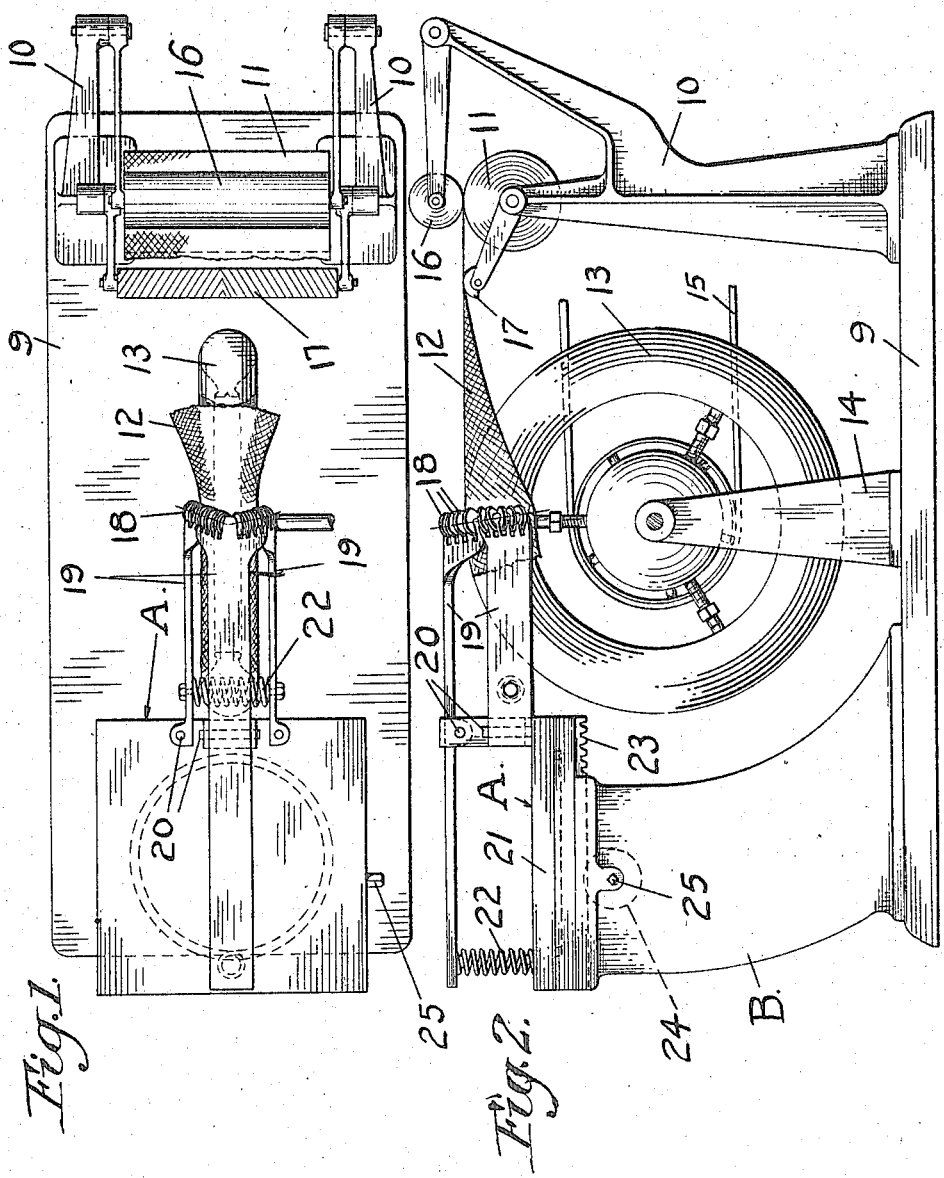
WITNESS:
INVENTORS:
George F. Fisher,
BY and Raymond B. Price.
THEIR ATTORNEY.

UNITED STATES PATENT OFFICE.

GEORGE F. FISHER, OF PLAINFIELD, NEW JERSEY, AND RAYMOND B. PRICE, OF NEW YORK, N. Y., ASSIGNORS TO THE HARTFORD RUBBER WORKS COMPANY, A CORPORATION OF CONNECTICUT.

TIRE-BUILDING MACHINE.

1,264,170.  Specification of Letters Patent.  Patented Apr. 30, 1918.

Application filed July 12, 1915. Serial No. 39,301.

*To all whom it may concern:*

Be it known that we, GEORGE F. FISHER and RAYMOND B. PRICE, both citizens of the United States, and residents, respectively, of Plainfield, county of Union, and State of New Jersey, and New York city, county of New York, and State of New York have invented certain new and useful Improvements in Tire-Building Machines, of which the following is a full, clear, and exact description.

This invention relates to tire building machines and has for an object to provide a simplified and improved apparatus for pressing the tire fabric to partake of the configuration of the ring core.

In constructing a tire it is customary to employ a revoluble ring core upon which strips of bias-cut rubber treated fabric are wound from a stock roll of the material. It is important that the various layers or rounds of the material upon the ring core be shaped respectively to intimately partake of the configuration of the core, and for this purpose spinning rolls or disks are moved upon the fabric radially in a direction from the crown of the core toward the bead portions thereof. In practice a round of the fabric is drawn on the ring core from the stock roll while the ring core is power turned slowly through one revolution at a speed of about 10 revolutions per minute. The ring core is then halted, and the fabric thereon is severed from the fabric supply. Then the ring core is revolved rapidly at about a speed of 110 revolutions per minute and during this fast rotation of the ring core the spinning rolls or disks above referred to are moved bodily over the fabric in a radial direction from the crown of the core toward the bead portions thereof and shape and press the fabric to conform intimately to the configuration of the core. These alternate steps of applying and then pressing the fabric to conform to the configuration of the ring core are continued until the fabric portion or carcass of the tire has reached the required dimensions.

Our present invention obviates the above described step of imparting a high rotary speed to the ring core while simultaneously moving the stitching rolls bodily over the fabric in a direction radially of the core and provides a means for effectively pressing down or "stitching" the fabric upon the ring core substantially as fast as it arrives from the fabric supply to the ring core during the slow single revolution made by the ring core when taking on the fabric. This we accomplish by stationing disks around a predetermined portion of the core and disposing the disks to incline diagonally across the surface of the core, as will hereinafter be more fully described.

With the above and other objects in view, the invention consists of certain novel details of construction and combinations of parts hereinafter fully described and claimed, it being understood that various modifications may be resorted to within the scope of the appended claims, without departing from the spirit or sacrificing any of the advantages of the invention.

The invention can be readily understood from the following description taken in connection with the accompanying drawing, in which—

Figure 1 is a plan view of a tire building machine embodying our invention.

Fig. 2 is a side elevation of the parts shown in Fig. 1.

Referring now to the drawings, in which like characters of reference designate similar parts, 9 designates a base upon which is mounted a standard 10 that carries a stock roll 11, from which rounds or plies of bias-cut fabric 12 are supplied to the ring core 13. The ring core is revolubly mounted on a standard 14 carried by the base 9 and is adapted as usual to be power driven as indicated at 15 or otherwise. During each single revolution of the ring core, at about a speed of ten revolutions per minute, more or less, a round of the fabric is drawn from the fabric supply onto the ring core, in the usual and well known manner, the liner strip, which separates the convolutions of the stock roll, being simultaneously spooled upon a roll 16 as shown. On the way to the core the fabric is freed from wrinkles and the like by the usual divergently grooved member 17.

In carrying out our invention we provide a series of disks 18 which are stationed around a portion of the ring core in the form of an arch which conforms to the configuration of and embraces the ring core. The disks are revolubly carried upon a support A mounted on a base B, the support comprising arms 19 pivotally secured at 20 to a bed 21 and spring-pressed at 22 toward the core to maintain the disks in contact therewith. The support A may be moved toward and away from the core to move the disks bodily in or parallel with the plane of the core whereby to position them at the point where the fabric comes on to the core from the fabric supply, or approximately so, as shown in Fig. 2. This adjustment of the support is effected by a rack 23 which is operated by a gear 24 and shaft 25.

The disks 18 are disposed to extend diagonally across the surface of the core so that they have a tendency to be frictionally moved or advanced bodily upward by the fabric in an oblique direction from the beads of the core toward the crown of the core, but since they are held by the support against such movement they will drag somewhat on the fabric and scrape or wipe the fabric in a downward radial direction from the crown of the core toward the beads of the core, thereby shaping the fabric intimately to the configuration of the core. The disks on opposite sides of the core are oppositely angled as best shown in Fig. 1, so that they converge and thus effect symmetrical shaping of the fabric on both sides of the core.

In operation the end of the web of fabric 12 is pressed upon the ring core to which it adheres, and the support A is then moved up until the disks 18 bear upon the fabric web at or near its point of contact with the ring core. The ring core is then rotated at a speed of about ten revolutions per minute, more or less, and during each single revolution draws a round of the fabric from the fabric supply onto its periphery. The disks operate during rotation of the core to press down or stitch the fabric into intimate contact with the surface of the core substantially at the moment the fabric arrives at the core from the fabric supply. The disks are arranged to overlap each other so that the portion of fabric operated upon by one disk will be overlapped by the portion operated upon by the next adjacent disk, and thus all points on the fabric will be stitched down and shaped intimately to the configuration of the core. The above described operation is continued until a sufficient number of superposed plies or layers of the fabric have been laid upon the core to build the carcass to its desired dimensions.

Having described our invention, what we claim and desire to protect by Letters Patent is:

1. A tire-making machine comprising in combination, a fabric supply, a ring core, and a series of rollers positioned transversely of the core, and diagonally disposed with respect to the sides thereof, said rollers being positioned adjacent the line of contact of fabric with the core.

2. A tire making machine comprising the combination of a sheet fabric supply, a power driven ring core, and an arched series of diagonally disposed disks embracing a portion of the core, said disks being positioned adjacent the line of contact of fabric with the core.

3. A tire making machine comprising the combination of a sheet fabric supply, a power driven ring core, and a series of disks each extending diagonally across the surface of the core, said disks being positioned adjacent the line of contact of fabric with the core.

4. A tire making machine comprising the combination of a sheet fabric supply, a power driven ring core, and disks diverging diagonally across the surface of the core, said disks being positioned adjacent the line of contact of fabric with the core.

5. A tire making machine comprising the combination of a sheet fabric supply, a power driven ring core, a support, and a series of disks on the support spring-pressed laterally toward the core and inclined diagonally across the surface of the core, said disks being positioned adjacent the line of contact of fabric with the core.

6. A tire making machine embodying the combination of a sheet fabric supply, a power driven ring core, a support, and disks carried by the support movable in or parallel with the plane of the core and spring pressed laterally toward the core, said disks being inclined diagonally across the surface of the core and positioned adjacent the line of contact of fabric with the core.

7. A tire making machine comprising the combination of a sheet fabric supply, a power driven ring core, a support, and a series of disks carried thereby to embrace a predetermined portion of the ring core and each disposed diagonally across the surface of the core, said disks being positioned adjacent the line of contact of fabric with the core.

8. A tire-making machine comprising in combination, a fabric supply, a ring core, and two sets of disks diverging diagonally across the surface of the core, the axes of the disks of each set being alined, said disks being positioned adjacent the line of contact of fabric with the core.

Signed at New York, N. Y., June 24th, 1915.

GEORGE F. FISHER.

Signed at New York, N. Y., June 22d, 1915.

RAYMOND B. PRICE.